Aug. 2, 1932.  H. C. DUNN  1,869,470
DIFFERENTIATING BRAKE
Filed July 19, 1929  4 Sheets-Sheet 1

INVENTOR:
HILLIS C. DUNN
by his att'y.

Aug. 2, 1932.   H. C. DUNN   1,869,470
DIFFERENTIATING BRAKE
Filed July 19, 1929   4 Sheets-Sheet 2

INVENTOR:
HILLIS C. DUNN
by his atty.

Aug. 2, 1932.    H. C. DUNN    1,869,470
DIFFERENTIATING BRAKE
Filed July 19, 1929    4 Sheets-Sheet 3

INVENTOR.
HOLLIS C. DUNN
by his att'y.

Aug. 2, 1932.  H. C. DUNN  1,869,470
DIFFERENTIATING BRAKE
Filed July 19, 1929  4 Sheets-Sheet 4

INVENTOR:
HILLIS C. DUNN
by his att'y.

Patented Aug. 2, 1932

1,869,470

UNITED STATES PATENT OFFICE

HILLIS C. DUNN, OF EAST McKEESPORT, PENNSYLVANIA

DIFFERENTIATING BRAKE

Application filed July 19, 1929. Serial No. 379,481.

My invention pertains to an equilibrating or differentiating brake and more particularly to brake mechanism either for automotive, railroad, railway or aircraft vehicles so designed as reliably to function automatically to distribute the total braking effect between the wheels of the vehicle in any desired proportion to any change in the center of gravity of the adjacent part of the body and to maintain the preferable or chosen distribution.

The efficiency of any of the present brake systems, in which the braking effect is applied to more than one wheel of a moving vehicle, depends on an adjustment which tends to apply substantially the same amount of braking effect to each of the wheels while contriving to maintain the road friction in excess of the braking effect, so that the rotation of the wheels to which the braking effect is applied will not cease, to cause the road traction to become lost. Brake mechanisms are now initially adjusted while the vehicle is standing level and unloaded, hence, whenever a vehicle is unevenly loaded, or when it is traveling on a road sloping to the right or to the left from its direction of travel, or when it is not traveling in a straight line, the initial adjustment becomes incorrect under such other temporarily existing conditions because a wheel or wheels of one side or at one end of the vehicle will bind or lock while another wheel or other wheels are not adequately sharing the total amount of braking effect desirably to be applied. Ordinarily, the wheel or wheels which are sustaining the least weight tend to become locked when the brakes are applied.

I have not been unaware that the art pertaining to brake rigging has been highly developed and my familiarity includes not only marketed constructions, but patented disclosures including those of Paxton et al, No. 713,339 of 1902; Pepple, No. 787,691 of 1905; Adams No. 1,365,364 of 1921; and Monsen No. 1,609,378 of 1926. However closely the prior art may have approached my idea, apparently, there has been a failure to realize how simple a rearrangement of nearly standard parts of braking mechanism would reliably and automatically achieve differentiating braking effect properly to vary the braking action to suit the differing requirements at different wheels, hence the beneficial results accomplished by my invention have not been realized by the public.

My invention proposes to establish a predetermined mounting of the brake mechanism in its entirety so that regardless of the periodic or constantly varying relative movement between a spring-connected or otherwise reactingly supported axle unit and superstructure (which relative movement I utilize automatically to vary the time of initiation of, and then the pressure exerted at, the brake) one mechanical principle involved in the predetermined mounting will always obtain. Thereby, my structural arrangement will be adapted automatically to compensate for any shift of weight from one side or from one end of the vehicle to the other side or end respectively, or for any compound shift of weight and in all cases irrespective of the cause. The predetermined mounting is so established that an automatic compensating adjustment occurs which becomes the equivalent in effect to lengthening or shortening the individual brake rods in the same proportion or any desired predetermined proportion as the weight is shifted so as to apply differentiating braking effects on different wheels in the same proportion.

With railroad or railway cars which run on tracks, a locked wheel or wheels is primarily to be avoided owing to consideration of safety and because with a locked wheel traction is very greatly reduced and a corresponding amount of brake effect is lost, and secondarily, as a mechanical consideration, because of the consequential wear on a small part of the tread of the wheel to cause a so-called "flat wheel". With automotive road vehicles, besides the two considerations just mentioned, an added danger is associated with the fact that they do not travel on rails and an unbalanced locking of wheels will inevitable tend to force the vehicle out of its line of travel or beyond the control of its driver.

I think it well to enumerate the different conditions to be encountered during vehicular transportation.

In the case of automotive road vehicles:

1—Straight, flat road, no grade.
2—Straight, crowned road, no grade.
3—Straight, flat road, grade.
4—Straight, crowned road, grade.
5—Curved, flat road, no grade.
6—Curved, crowned road, no grade.
7—Curved, flat road, grade.
8—Curved, crowned road, grade.
9—Curved, banked road, no grade.
10—Curved, banked road, grade.
11—Unevenly loaded vehicle under any of the above conditions.

In case of railroad or railway equipment, including steam, electricity, gasoline, kerosene, gas, fuel oil, or any other source of energy:

1—Straight track, no grade.
2—Straight track, grade.
3—Curved track, no grade.
4—Curved track, grade.
5—Banked track, no grade.
6—Banked track, grade.

In the case of all types of aircraft on which brakes are applied to landing wheels at time of landing to prevent sudden upsetting, swerving or turning of the plane while on the ground due to uneven ground or any other condition which would cause a change in the center of gravity.

One object of my invention is the avoidance of an unbalanced wheel locking and avoidance of premature locking of some particular wheel or wheels and avoidance of an improper application of braking power, which is to say, avoidance of excessive braking effect on a wheel or wheels which at the time sustain the least weight and as a corollary, earlier initiation and greater braking effect exercised upon the wheel or wheels happening to sustain the most weight.

Another general object, with consideration of commercial merit, is the provision of a construction which is simple, easily installed, readily adjusted or readjusted, and as economical of manufacture as present nearly standard braking systems.

Figure 1:
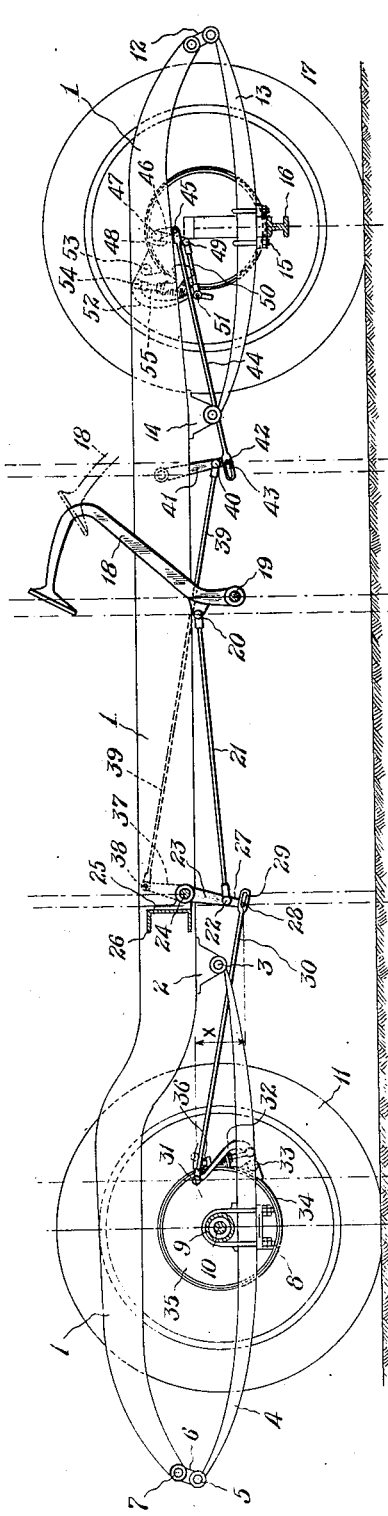
Figure 1 is a side elevation of an automobile chassis mounted on wheels (the two near wheels being removed) and carrying an equilibrating and differentiating brake appliance embodying one form of my invention with its parts occupying positions as though the automobile is unloaded.

Inasmuch as the construction on each side may be considered as identical or duplicated, except for the usual actuating mechanism including parts crossing or near the longitudinal center line of the vehicle, I will use the singular number in describing either a rear or front braking appliance.

A chassis frame 1 carries somewhat near its rear end a depending bracket 2 to which is pivoted at 3 the front scroll of an upwardly bowed vehicle spring 4, the rear end scroll of which has a pivotal articulation at 5 with a conventional shackle 6, the upper end of which is in turn pivoted at 7 to one rear extremity of the frame. Attached to the spring 4 near its middle by means of U-bolts 8 is a rear axle housing 9 in which are operatively mounted a pair of alined axles 10. A wheel 11 is carried at the extremity of the axle 10.

Figure 3:
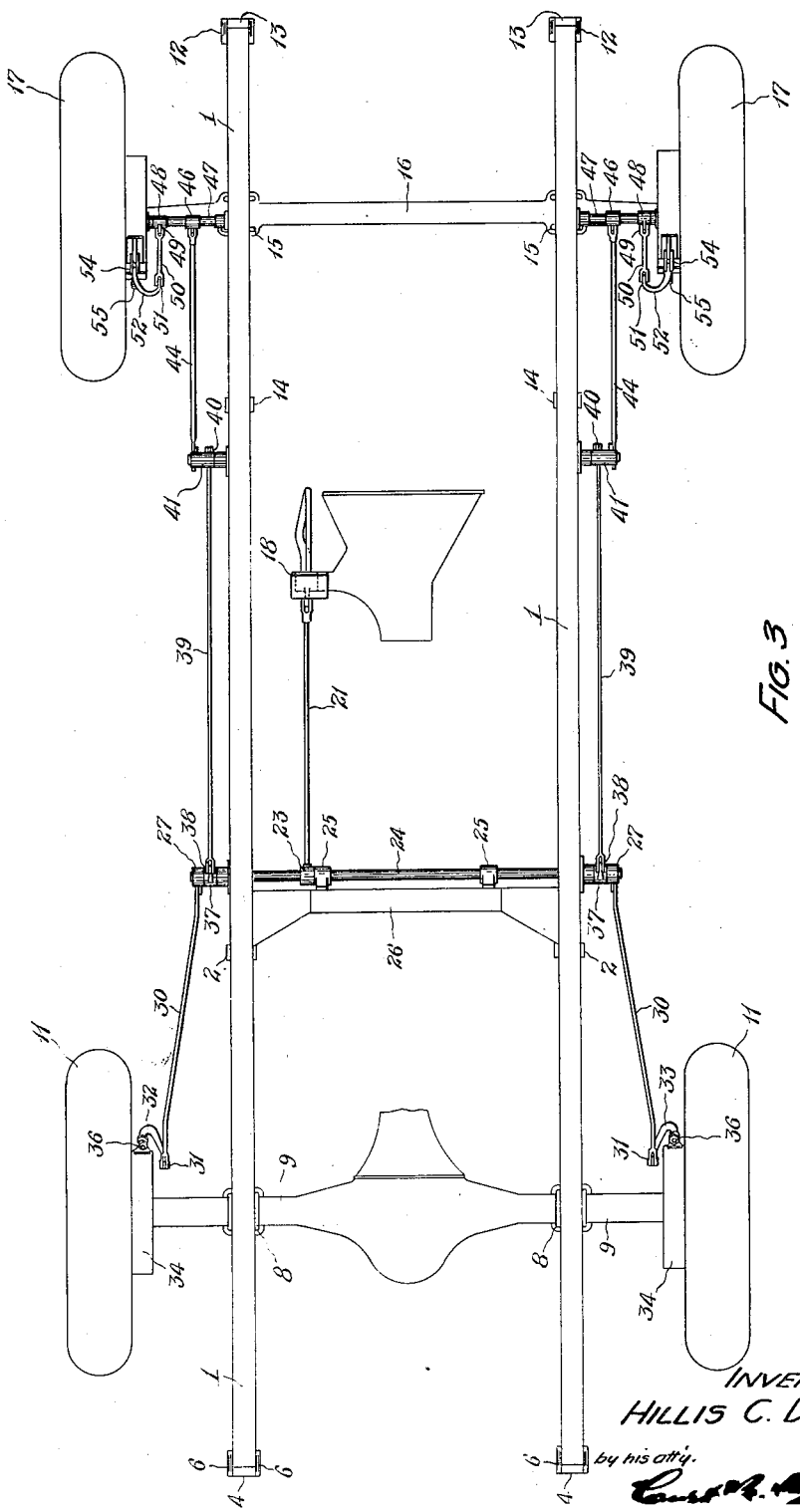
Figure 3 is a plan view of the automobile chassis shown in Figure 1.

The front extremity of the frame 1 is provided, according to the preferred application of my invention, with a pivotally hung shackle 12 to which is pivotally connected the front end of a spring 13 which has its rear end pivotally hung from a bracket 14 appropriately carried by the frame. Intermediately of its ends the spring 13 is bolted at 15 to a front axle 16 which carries on its end a wheel 17. I have confined myself to the disclosure of my invention in association with what has come to be known as the service brake, and since the principle is manifestly equally applicable whether subject to realization through the control of a foot pedal or a hand lever actuation, I have omitted, because superfluous, any showng of the alternative or emergency brake appliance. A brake pedal 18 is pivotally mounted at 19 to a suitable bracket hung from the frame in any suitable manner not necessary to be shown in more detail than suggested in Figure 3 because common practice. Articulating at 20 with the rear side of the pedal 18, at a point somewhat above the pivot 19, is a rod 21 the rear end of which has articulated connection in turn at 22 with the lower end of a lever 23, the upper end of which is fixed upon a crosswise extending rock-shaft 24 which is mounted in spaced bearings 25 carried by a cross brace 26 as appears in Figure 3.

The extremity of the shaft 24 has fixed to it a depending lever 27, the lower end of which carries a pin 28 which projects through a slot 29 which is fashioned in the forward end of a rear brake rod 30, thereby to provide a purposeful lost-motion connection, the advantageous function of which will hereinafter appear. It is of importance to realization of the benefit of my invention that the lower end of the lever 27, or that the path of arcuate movement of the pin 28 is constantly low enough, with consideration of the type and manner of mounting of the brake proper to be next described, so that the rod 30 will invariably slope upwardly in a rearward direction. With the type and manner of mounting of rear externally applied brake proper shown in Figure 1, the rear end of the rod 30 articulates at 31 with an upstanding brake band lever 32 which is pivoted at 33 to the forward end of the lower section of a brake band 34, one point of which is fixed to the axle housing so it cannot turn with the drum (one of the sections of this band is often made longer than the other, from the point of the band fixed to the axle housing, to achieve a so-called self-energizing effect whereby the longer section tends to wrap itself around the drum) which is adapted to envelop and conform to a brake drum 35. The forward end of the upper section of the band has attached to its extremity the conventional type of adjustable and spring controlled rod 36, which latter is also connected and aids in supporting the brake band lever 32 a short distance from its pivotal connection at 33. Since the brake mechanism proper, just described, has long been in common use and nothing is claimed for its elements, singly or collectively, the immediately foregoing explanation of it is considered adequate when coupled with this statement, that a forward pull on the rod 30 acts to pull the forward lower section of the band upwardly and the forward upper section of the band downwardly so that the two together effect a constricting action upon the drum 35, the provided spring carried by the rod 36 acting to again expand the band when foot pressure against the pedal 18 is released.

In order automatically to utilize the load at any one or more wheels, so that the greater the load the greater will be the braking effect applied to such wheel in proportion to the load upon it, my invention is designed so that the rod 30, in effect, becomes shortened whenever a greater load is sustained by the wheel to which any particular rod 30 leads. It becomes, in effect, shorter because closer approach of the frame 1 and axle 10 to each other acts to take up some of the lost-motion at 28—29 to thereby insure an earlier initiation of the braking effect and eventually, if need be, an exertion of a greater braking effect than at some other wheel which sustains less load. However, with the type and manner of mounting shown, for instance, in Figure 1, it is vital that the pivot point 31 at no time can reach a point lower than any point in the path of travel of the pin 28. And it is for this reason that I supplied the demonstration furnished by Figure 2.

My examination of different cars of this year's manufacture, both in the show rooms and earlier models on the road, disclosed the fact that a line drawn through the front connection from point P on a brake rigging at one forward terminal of the brake actuating rod and a rearward oscillatory pivot point P' on cars equipped with four-wheel brakes has, in the majority of the cars examined, inclined more or less in the right direction, namely, upwardly. However, two very important disclosures clearly indicated to me that this correct inclination on some of the cars is accidental (or incidental) and not for accomplishing certain results (as I have proposed to make use of it) in braking:

1.—The connections between the same points on the rear wheel brakes of these same cars are all (without exception as far as I have noted on more than twenty different makes of cars examined) inclined more or less in the wrong direction, in some cases point P on the brake rigging being three inches (3") to four inches (4") below the elevation of point P' at the bottom of the rock lever.

2.—These front connections, at point P, although more or less in the right direction, have been brought as low as constructional arrangement of other parts will permit, in fact, many of the cars have special forgings designed purposely to bring point P to as near the horizontal level of point P' as possible.

Moreover, an initial adjustment to suit varying sensitiveness of the springs or varying arcs of expectable spring flexure may be accomplished either by varying the length of the brake drum rods or by varying the distance of the latter from the longitudinal center line of the car. For instance, the longer the rods are or the closer they are to the longitudinal center line, the less in each case will be the desired differentiating and equilibrating braking effect. Clearly too. selection of an internal expanding type of brake band would be equally feasible provided connection therewith of my operating mechanism were appropriately altered. Likewise, incorporation of the hydraulic principle anywhere in the train of mechanism embodying my invention would be an obvious alternative equivalent of the wholly mechanical arrangements I have disclosed as exemplifications.

Figure 2:
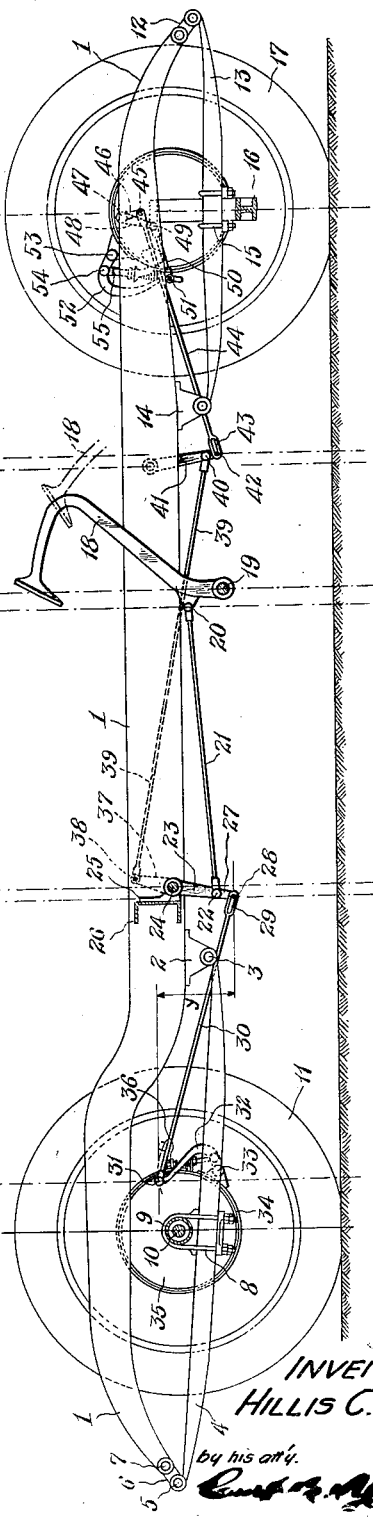
Figure 2 is a view corresponding to Figure 1 showing the altered relative position of certain parts when the chassis is sustaining a load.

When the axle 10 and superposed portion of the frame 1 move closer together, as shown in Figure 2, the point 31, by reason of becoming more elevated with respect to the changed or lowered position of the pin 28, (by an amount indicated by the difference in length between the double arrow-headed lines x and y in Figures 1 and 2 respectively)

pulls the rod 30 rearwardly until the pin 28 is closer to or touches the extreme end of the slot 29, as shown in Figure 2, or the opposite end of the slot from that where the pin 28 is shown to be located in Figure 1. As a matter of fact, this desired take-up of the lost-motion is contributorily accomplished by the action of the load in flattening the bow of the spring 4, thereby actually moving the rear axle and wheel slightly rearwardly, as indicated by the disalinement of the two vertical lines *a* and *a'* which pass through the centers of the axles 10 in Figures 1 and 2 respectively. Manifestly, when the pin 28 occupies the end of the slot, where it appears in Figure 2, any depression of the pedal 18 will sooner initiate a constriction of the brake bands 34 than will a corresponding depression of the pedal 18 if the pin 28 is at the opposite end of the slot 29, as shown in Figure 1, in which case the pin 28 would first have to engage the opposite end of the slot 29 before any effective pull could become exerted on the rod 30. It should now be clear that an earlier initiation of a braking effect on the drum 35 will occur, or a greater braking effect be applied to it in proportion to added load thereover and also that such a desirable result is not only automatic, but independent of the comparative load upon any other wheel. Also, if the pin 28 were ever higher than the point 31, the bodily movement of the rod 30, in response to added load upon the wheel 11, would be in the wrong direction, that is rearwardly.

In considering the movement of the rod 30, Figures 1 and 2, two actions take place tending to separate pin 28 and point 31: point 31 is moved rearward because of the straightening of the bow of spring 4, and at the same time the downward vertical movement of pin 28 increases the straight-line distance between said pin and point. Assume now that pin 28 were mounted above the horizontal line through point 31 to correspond to my Figure 1 (it matters not whether lever arm 23 were turned upward or by any other arrangement), then to correspond to Figure 2 pin 28 were brought down to the horizontal level through point 31, two actions have again taken place, but while point 31 will have moved rearward because of the flattening of spring 4, the downward vertical movement of pin 28 will have decreased the straight-line distance between said point and pin and the net result of the two actions will be the difference between them, while in the first instance the net result is the sum of the two actions. The action because of the straightening of spring 4, as already mentioned above, is a fixed definite action which always has been taken into consideration. I make use of this action combined with the action resulting from the downward vertical movement of pin 28, and control the net result of the movement by the location of pin 28 with reference to point 31, both as to the horizontal and vertical distance separating them and their proximity to the horizontal center line of the vehicle.

Also fixed to the rock-shaft 24 just inside of the lever 27 is an upstanding lever 37 to the free end of which is pivotally connected a forwardly extending rod 39 which articulates at 40 with an intermediate portion of a lever 41 which is pivotally hung from the frame. The lower end of the lever 41 likewise carries a pin 42 which projects through a slot 43 fashioned in the rear end of a rod 44 which leads to the brake on the front wheel 37 through the following connecting train; pivot 45, arm 46, frame pivoted at 47, arm 48 pivoted at 49 with short rod 50, the other end of which is pivoted at 51 to the lower end of brake band lever 52 which is pivotally attached at 53 to one brake band and to which is pivotally connected at 54 the rod 55 which is in turn attached to the other brake band. It will be understood that the principle of my invention is identically associated with the front wheel brake, which is to say, when the forward end of the frame 1 and axle 16 have approached nearer to each other and the front wheel 17 has been carried forwardly, the pin 42 will have moved to the opposite end of the slot 43, or from the position in which it appears in Figure 1 to the position in which it appears in Figure 2.

Figure 4:
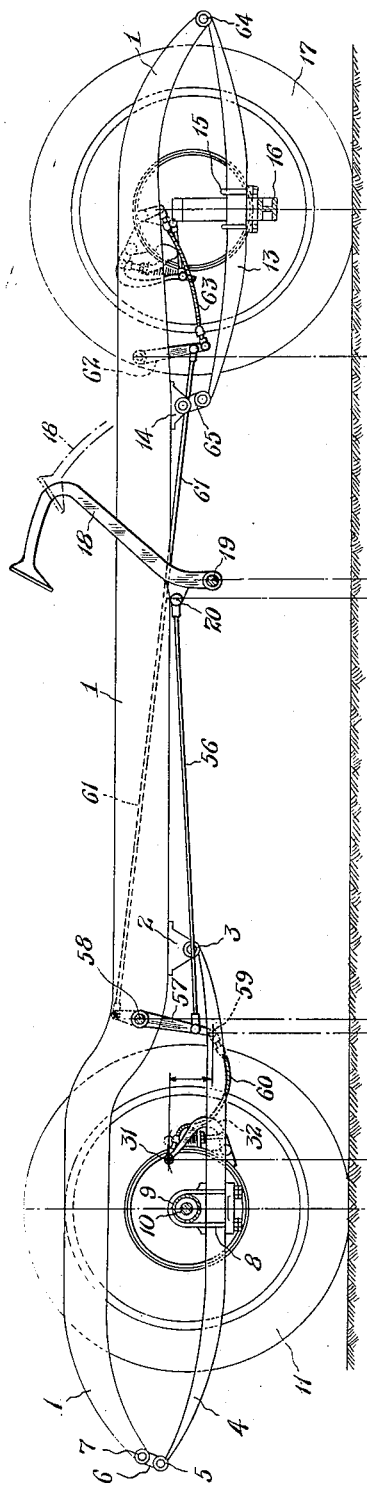
Figures 4 and 5 illustrate my invention, after the manner of Figures 1 and 2, with several modified features, Figure 4 showing the parts in position when the vehicle is unloaded and Figure 5 the shift in position of some of the parts when a load is applied.
Figure 5:
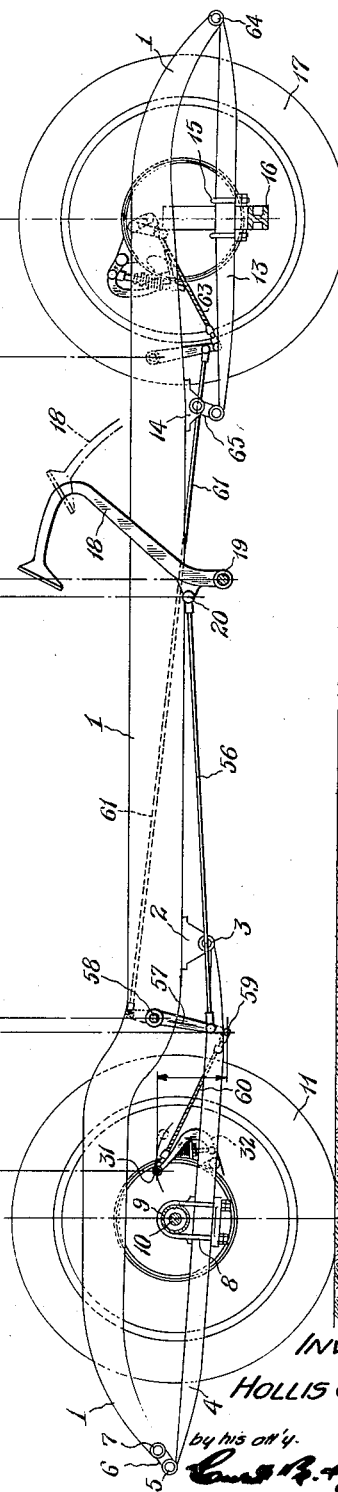

I have realized that the lost-motion connection 28—29 or 42—43 of Figures 1 and 2 is not indispensable, and that equivalent constructions may be substituted, wherefore I have shown the modification to which Figures 4 and 5 pertain. In fact, these two views embody three modified features, first, the substitution of flexible cables for the 28—29 and 42—43 lost-motion connections; second, the shifting of the equivalent of the rock-shaft 24 nearer to the rear wheel and a similar change at the front; and third, the placing of the front spring shackle at the rear instead of the front end of the spring.

Similarly attached to the same foot pedal 18 is a rearwardly extending longer rod 56 articulating with a lever 57 which is the equivalent of the lever 23, though located closer to the rear wheel 11 being pivotally hung from a shaft 58 rearwardly to the bracket 2. The lever 57 extends below the point of articulation of the rod 56 with it and has suitably attached to its lower extremity 59 a cable 60, the other end of which is appropriately secured at the same point 31 at the top of the brake band lever 32. When the vehicle is unloaded, as shown in Figure 4, the cable 60 will be slack necessitating a measurable depression of the foot pedal 18 to first tauten the cable before any braking effect can occur, whereas in Figure 5 the two factors, namely, closer approach of the frame and axle and bodily shift of the wheel construction rearwardly will have automatically tautened the cable 60 so that any depression of the foot pedal 18 will immediately commence to constrict the brake bands of that particular wheel which may happen to be heavily loaded. It is to be understood that the connections will be so adjusted that the maximum expectable load will just tauten the cable without constricting the brake bands to a degree in which braking effect becomes prematurely applied. In this form also, the arrangement is and should be such that the point 31 can never be below the point 59.

By placing the intermediate lever 57 closer to the rear wheel the advantage is gained of a greater sensitiveness to load in response to the two component factors viz., closer relation of the frame 1 and axle 10 and a rearward displacement of the wheel in consequence of the straightening of the spring 4.

A considerably longer rod 61 constitutes the equivalent of the rod 39, (Figures 1 and 2) and it articulates at its forward end with a lever 62 which is the equivalent of the lever 41 (Figures 1 and 2) except that the lever 62 has been moved forwardly or ahead of the bracket 14. A cable 63 effects connection between the lower end of the lever 62 and the train of articulated mechanism for controlling the front brake. The front end of the spring 13 is attached at 64 directly to the forward end of the frame 1, whereas the rear end of the spring is connected with the bracket 14 through the agency of a shackle 65. I illustrate this third modification consisting of shift of the forward spring shackle to the rear end of the spring though believing it to be less advantageous to do so, because the two previously explained factors, which cooperate with the other maintained relation (of having the point 31 always higher than the point 59 or the forward end connection of the cable 63 always higher than its rear end connection) tend to counteract each other. In other words, by placing the shackle 65 at the rear end of the front spring, the bodily shift of the front wheel 17 will be rearwardly to counteract in some measure the desirable tautening of the cable 63 in response to increase of load thereover. Control of such relative counteraction may, of course, always be achieved by appropriate predetermined adjustments.

Figure 6:
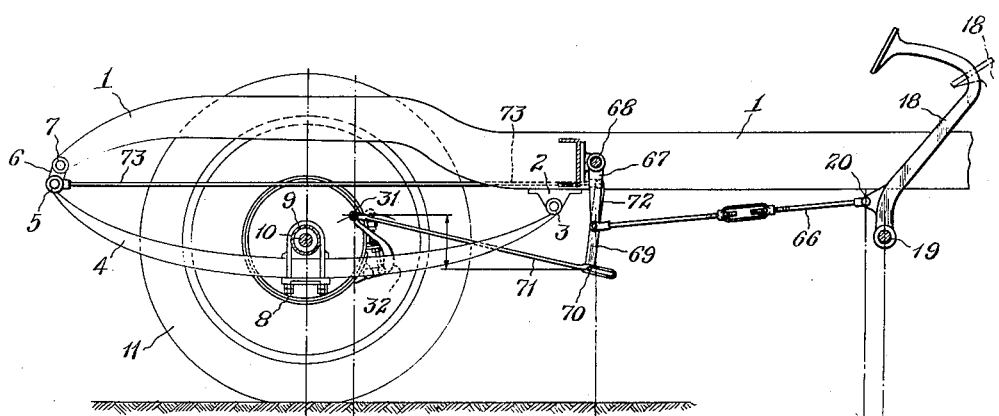
Figures 6 and 7 are views corresponding to the rear ends of Figures 1 and 2 illustrating a further modification.
Figure 7:
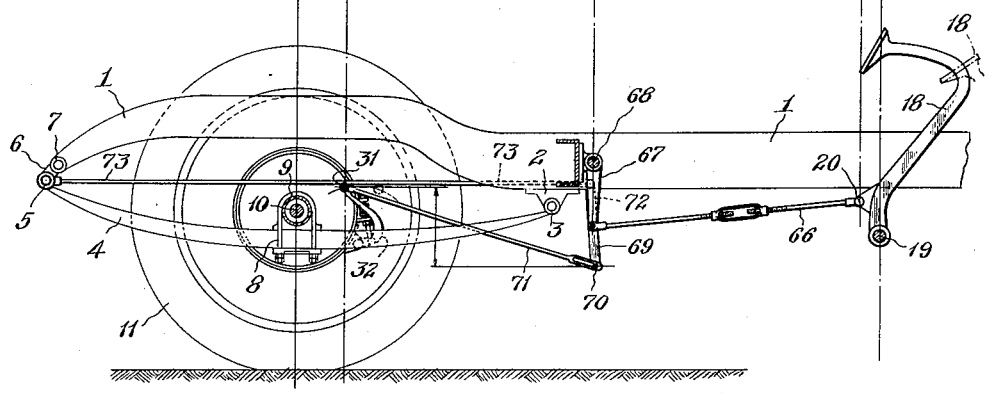

The modification to which Figures 6 and 7 pertain involves a positive mechanically operating contrivance to aid in achieving the automatic equilibrating and differential result. Attached to the brake pedal 18 is a turnbuckle rod 66 articulating with a lever 67 hung from a rock-shaft 68. A double arm level is also pivotally attached near its middle to the lower end of the lever 67 and it has its lower arm 69 articulated with a lost-motion connection at 70 to a rod 71 which is pivotally attached at the same point 31 at the top of the brake band lever 32. An upper arm 72 of the double arm lever articulates with the forward arm of a rod 73, the rear end of which is connected with the lower end of the shackle 6. In consequence of movement of the shackle 6 from the position in which it appears in Figure 6 to the position in which it appears in Figure 7, the rod 73 will become bodily shifted rearwardly to swing the upper arm 72 rearwardly, hence the lower arm 69 forwardly and therefore to cause a take-up of the lost-motion at 70 to similarly achieve a realization of the benefit of my invention.

With a car equipped with four wheel brakes, whenever the two rear wheels lock and hence lose traction while the front wheels are exerting a braking effect with benefit of traction, I have a result very similar to one which is more readily comprehended and which is due to a condition of front wheels becoming locked and rear wheels rolling freely. In either case the tendency of the rear end is to rise or to swing aside. As a corollary, it is a lesser evil (when having four wheel brakes) to have only the front wheels lock than to have only the rear wheels lock, though it is preferable to have the rear wheels then properly applying a braking effect during traction.

It will now be perceived that I have taken advantage of a condition always existing in the construction of vehicles, namely, that a superstructure as a unit is movably connected with an assembled axle unit or units by means of springs or other reacting agents and that in consequence a definite but limited relative movement occurs, mostly in a vertical line, and that I utilize the changing relative positions of the two connected units so as to improve the braking system by making it more efficient owing to the fact that the braking effect is distributed by, and in proportion to, any shift of weight and hence any shift either of the horizontal or of the vertical axis of gravity whereby a great reduction or substantial elimination of the tendency to twist the superstructure as a unit will occur and thereby permit of a lighter and hence cheaper superstructure. It is remarked that the adoption of four-wheel brakes on automobiles has led some automobile manufacturers to realize the necessity of strengthening the chassis by adding additional cross-braces or employing a heavier construction for withstanding the additional braking effect which, when improperly distributed, was discovered to cause additional strain.

The advantages of my invention may be classified under the three factors of efficiency, safety and economy.

Greater efficiency is realized because the braking effect becomes automatically shifted from one wheel to another as the weight shifts and in the same proportion as the shift of weight, hence, the distribution of braking effect is correct at any given time for the condition then existing, thus permitting a greater total braking effect without a tendency to lock any of the wheels (undesirable under any and all circumstances for reasons of safety, efficiency and economy) and yet more quickly stop the travel of the vehicle. In an automobile having only rear wheel brakes, both wheels should lock at the same time if at all, and in the case of four-wheel brakes as between the evils of locking in pairs, I maintain that the two front wheels should first lock in unison and thereafter the two rear wheels in unison.

I realize this last statement is contrary to commonly accepted belief, but it will not be denied by students of the principle involve. With a perfectly equilibrated rear wheel brake pair, both wheels to which the braking effort is applied will lock in unison, a much desired condition if and when wheels must become locked. In the case of four-wheel brakes having a sixty-forty (60—40) per cent distribution, rear and front respectively, because of an estimated like constructional distribution of weight, the element of danger is greatly increased if (as at present) the rear wheels are the first to become locked.

By use of my invention, greater safety is realized because a greater total braking effect can be utilized without danger of wheel-locking and skidding and therefore an automobile may be brought to a stop in a shorter distance to minimize possible damage to the car or accidental injury to its occupants and greater economy is realized because locking of the wheels and skidding will be less often necessitated so that there will be a resulting saving in wear on tires, reduction of strains with accompanying loosening of bolts, nuts and rivets and incidentally the squeaks and rattles emanating from loose parts.

It is to be realized that the scope of my invention comprehends many equivalent constructions. The showing of the drawings and the particular description are merely a specific exemplification of a plurality of mechanical embodiments and arrangements.

I claim:—

1. In an appliance of the character described for use on a vehicle having a superstructure reactingly supported at each of a plurality of wheels, the combination of brake riggings carried at said wheels and each including a brake lever and a brake member adapted to engage a certain wheel, single actuating mechanism carried by said superstructure, and a single element connecting said mechanism with each brake lever, the relative elevations of the pairs of points of connection of the ends of said elements with said actuating mechanism and with one of said brake levers respectively being so contrived that the point of connection of each of said elements with said mechanism is constantly lower than the point of connection of the same element with its brake lever irrespective of the spring flexure in response to any equivalent of load, the effective length of said connecting elements being automatically adjustable in response to spring flexure whereby to realize automatically differentiating braking distribution.

2. In combination for use with a vehicle frame having a plurality of wheels connected therewith adapted for movement relative thereto; comprising, brake riggings operatively associated with said wheels respectively, brake actuating mechanism including a plurality of rock levers mounted to turn on said frame and a lost motion connection between each of said brake riggings and rock levers, the points of articulation of any particular lost motion connection with a rock lever and brake rigging respectively being constantly of predeterminedly different elevation irrespective of the relative movement between the frame and the particular wheel with which said lost motion connection cooperates whereby the measure of lost motion of the distinct lost motion connections may independently vary according to the approach or recession of the corresponding wheel relative to said frame to achieve a differential variation in the initiation of the braking effects against the different wheels according to the load sustained thereby.

3. In an appliance of the character described for use with a vehicle having wheel-carrying units which are spring-connected with a superstructure, the combination of a plurality of brake riggings carried by said units and each including a brake lever and a brake element adapted to engage a certain wheel, a single brake-actuating mechanism carried by said superstructure and flexible connecting members each having its one end attached to said mechanism and its other end articulated with one of said brake riggings; the arrangement, when the vehicle is on a substantially horizontal plane, establishing predetermined and constantly maintained relative elevational locations of the means of the paths of movement of the pairs of points of attachment of each of said connecting members in response to spring flexure, whereby automatically to vary the times of engagement of and the amount of pressure between said brake elements and wheels respectively according to the existing relative positions of said wheel-carrying units and superstructure in response to varying flexure of different springs and whereby differentially to apply greater braking effect in proportion to added load on any wheel or wheels.

4. In combination for use with a vehicle frame having an axle, wheels, and a structure including springs connecting said frame and axle; of independently operable brake riggings mounted for cooperation with said wheels respectively, brake-actuating mechanism movably connected with said frame and lost-motion connections between each of said brake riggings and actuating mechanism, each lost-motion connection including a lever and rod slidably articulated to each other, the said connections each having a point in common with the actuating mechanism which is more often predeterminately lower than a point thereof which is common to its brake rigging so that their measure of lost-motion becomes decreased or increased according to the approach or recession of said axle and frame relative to each other whereby automatically and differentially to vary the initiation of the braking effects at each individual wheel.

5. In an appliance of the character described for use with vehicles having wheels and axle housings which are spring-connected with a superstructure, the combination of articulated brake riggings carried at each wheel and each including a brake lever and a brake element adapted to engage its wheel, and brake-actuating mechanism carried by said superstructure and having a lost-motion connection with each of said brake levers, the connections of said mechanism with each brake lever being automatically adjustable in response to changing load distribution and adapted to take-up lost-motion preparatory to earlier initiation of brake application where the greater load is sustained whereby greater braking effect may be realized at the front of the vehicle when a sudden braking operation tends to shift increased weight to the front of the vehicle.

6. In a vehicle appliance of the character described for use with a pair of double-wheel-carrying axles which are reactingly connected with a superstructure, the combination of four brake riggings carried by said four wheels and each including a brake lever and a braking element adapted to engage its wheel, and an actuating mechanism carried by said superstructure and including rock levers together with distinct connections between each rock lever and brake lever, said connections being automatically variable in length measured from their points of connection with a rock lever and brake lever whereby to vary the time of engagement of said braking element and wheel and the amount of effort of the former against the latter according to the existing relative positions of said axles and superstructure in response to their reacting connection, the arrangement being such as to involve a predetermined and constantly maintained relative elevational location of the paths of movement of the articulation points of the connections between brake levers and rock levers whereby earlier to apply greater braking effect in proportion to added load on any individual wheel or any group of wheels.

7. In a differentiating brake appliance of the character described for use on a vehicle having a superstructure reactingly supported at each of a plurality of wheels, the combination of brake riggings at said wheels respectively, brake-actuating mechanism and separate connections between each brake rigging and said mechanism, said connections being automatically extensible and contractible as the angle made by a line through the ends of said connections with a horizontal plane increases and decreases in response to reacting relative movements between the superstructure and wheels, the limits of varying length of said connections and their proximity to the rotation planes of said wheels being adapted to provide a double differentiating adjustment whereby the time of initiation and amount of braking effect at each individual wheel is varyingly controlled by the equivalent of shifts in load and hence differentiating braking effects properly become earlier initiated and more strongly exerted where and when a condition which is equivalent to increased load exists.

8. In a differentiating brake appliance of the character described for use on a vehicle having a superstructure reactingly supported at each of a plurality of wheels, the combination of brake riggings at said wheels respectively, brake-actuating mechanism and separate lost motion connections between each brake rigging and said mechanism and each adapted automatically to become extended or contracted according to an increase or decrease of the angle each makes with a horizontal plane in response to an equivalent of added load upon the wheel to which it leads, the limits of varying length of said connections and their mean proximity to the rotation planes of said wheels being adapted to provide a double differentiating adjustment whereby the time of initiation and amount of braking effect at each individual wheel is varyingly controlled by the equivalent of shifts in load and hence a braking effect becomes earlier initiated and more strongly exerted at any wheel which is subject to a condition equivalent to increased load thereon.

9. In a differentiating brake appliance of the character described for use on a vehicle having a superstructure reactingly supported at each of a plurality of wheels, the combination of brake riggings at said wheels respectively, brake-actuating mechanism carried by said superstructure and lost-motion devices each in connection both with one of said brake riggings and with said actuating mechanism, the pair of points of connection of each of said devices being so contrived that the point of connection of each device with a brake rigging is ordinarily more elevated than the point of articulation of each device with said actuating mechanism whereby the relative approach of the superstructure and any particular brake rigging takes up a measure of the lost-motion in the device connected therewith and earlier initiates movement of a kind to there apply braking effect and consequently to insure the application there, of a comparatively greater braking effect in response to actuation of said mechanism.

10. In a differentiating brake appliance of the character described for use on a vehicle having a superstructure reactingly supported at each of a plurality of wheels, the combination of brake elements at said wheels respectively, brake-actuating mechanism carried by said superstructure and lost-motion connections each between one of said brake elements and said actuating mechanism, the pair of points of articulation of each connection which are located on a brake element and on said mechanism respectively being so contrived that the point on the brake element is higher at substantially all times than is the point on the mechanism and the distance between said pairs of points being furthermore so established that the relative approach of the superstructure and any particular reactingly connected wheel, earlier actuates the brake element there and consequently insures its application of a comparatively greater braking effect in response to controllable operation of said mechanism.

11. In a differentiating brake appliance of the character described for use on a vehicle having a superstructure reactingly supported at each of a plurality of wheels, the combination of brake riggings at said wheels respectively, brake-actuating mechanism movably connected with said frame and lost-motion connections between each of said brake riggings and actuating mechanism, each lost-motion connection including a lever and a slotted link slidably articulated to each other, the said connections each having a point in common with the actuating mechanism which is predeterminately lower than a point thereof which is common to its brake rigging so that their measure of lost-motion decreases or increases according to the local approach or recession of a particular wheel and the superstructure relative to each other whereby automatically and differentially to vary the initiation of the braking effects at each individual wheel.

12. In a differentiating brake appliance for cooperative use on a vehicle having a wheel-carrying structure, a superposed frame, a bowed leaf spring carried by said structure and a shackle pivotally connected with one end of said spring and also with said frame; the combination of a brake rigging at said wheel, brake-actuating mechanism carried by said frame and a lost motion connection between said mechanism and brake-rigging and extending in substantially the same direction as the length of said leaf spring, whereby the movement of said shackle about its pivots in response to relative approach of the frame and wheel structure causes a take-up of the lost motion in said connection preparatory to earlier initiation of a braking effect in response to actuation of said mechanism.

Signed by me, this 28th day of June, 1929.
HILLIS C. DUNN.